(12) United States Patent  
Minnette et al.

(10) Patent No.: US 8,991,632 B2
(45) Date of Patent: Mar. 31, 2015

(54) CANISTER

(75) Inventors: Jeffrey C. Minnette, Evansville, IN (US); David J. Jochem, Evansville, IN (US); Ken Jochem, Mt. Vernon, IN (US)

(73) Assignee: Berry Plastics Corporation, Evansville, IN (US)

( * ) Notice: Subject to any disclaimer, the term of this patent is extended or adjusted under 35 U.S.C. 154(b) by 18 days.

(21) Appl. No.: 13/544,753

(22) Filed: Jul. 9, 2012

(65) Prior Publication Data

US 2013/0008904 A1  Jan. 10, 2013

Related U.S. Application Data

(60) Provisional application No. 61/505,441, filed on Jul. 7, 2011.

(51) Int. Cl.
*B65D 17/34* (2006.01)
*B29C 65/08* (2006.01)
(Continued)

(52) U.S. Cl.
CPC ............... *B29C 65/087* (2013.01); *B29C 65/10* (2013.01); *B29C 65/18* (2013.01); *B29C 65/305* (2013.01); *B29C 65/568* (2013.01); *B29C 65/72* (2013.01); *B29C 66/1312* (2013.01); *B29C 66/542* (2013.01); *B29C 66/545* (2013.01); *B29C 66/723* (2013.01); *B29C 66/81435* (2013.01); *B29C 66/83413* (2013.01); *B65D 17/502* (2013.01); *B65D 81/3453* (2013.01); *B65D 43/0212* (2013.01); *B65D 2517/5013* (2013.01); *B65D 2517/5043* (2013.01); *B65D 2543/00092* (2013.01); *B65D 2543/00296* (2013.01); *B65D 2543/00314* (2013.01); *B65D 2543/00425* (2013.01); *B65D 2543/00527* (2013.01); *B65D 2543/00537* (2013.01); *B65D 2543/00648* (2013.01); *B65D 2543/00685* (2013.01); *B65D 2543/00731* (2013.01);
(Continued)

(58) Field of Classification Search
USPC ............ 220/270, 254.1, 258.2, 359.1–359.4, 220/612, 62.11, 62.22, 613, 656, 657, 659; 428/35.7
See application file for complete search history.

(56) References Cited

U.S. PATENT DOCUMENTS 2,614,727 A * 10/1952 Robinson ............... 220/780
3,276,616 A  10/1966 Lurie
(Continued)

FOREIGN PATENT DOCUMENTS

EP  0 536 137 B1  4/1993
EP  1930253  2/2011
FR  2827841  1/2003

OTHER PUBLICATIONS

The International Search Report and Written Opinion issued in connection with PCT/US2012/045965.
(Continued)

*Primary Examiner* — Anthony Stashick
*Assistant Examiner* — James Way
(74) *Attorney, Agent, or Firm* — Barnes & Thornburg LLP

(57) ABSTRACT

A canister includes a container having a body formed to include an interior region and a brim coupled to an upper portion of the body. The canister further includes a closure adapted to be coupled to the brim to close a mouth opening into the interior region.

38 Claims, 12 Drawing Sheets

(51) Int. Cl.
- *B29C 65/10* (2006.01)
- *B29C 65/18* (2006.01)
- *B29C 65/30* (2006.01)
- *B29C 65/56* (2006.01)
- *B29C 65/72* (2006.01)
- *B29C 65/00* (2006.01)
- *B65D 17/50* (2006.01)
- *B65D 81/34* (2006.01)
- *B65D 43/02* (2006.01)

(52) U.S. Cl.
CPC ............ *B65D 2543/00796* (2013.01); *B29C 66/81417* (2013.01); *B29C 66/81431* (2013.01)
USPC .............. 220/270; 220/359.1; 220/359.3; 220/612; 220/62.11

(56) References Cited

U.S. PATENT DOCUMENTS

| | | | |
|---|---|---|---|
| 3,834,606 A * | 9/1974 | Andersson | 229/406 |
| 3,934,749 A | 1/1976 | Andrulionis | |
| 3,938,686 A | 2/1976 | Milligan | |
| 3,956,550 A | 5/1976 | Sutch | |
| 4,109,815 A | 8/1978 | Collins, III | |
| 4,111,330 A | 9/1978 | Jordan | |
| 4,141,463 A | 2/1979 | Smith | |
| 4,171,084 A | 10/1979 | Smith | |
| 4,192,434 A | 3/1980 | Conroy | |
| 4,209,107 A * | 6/1980 | Crisci | 220/781 |
| 4,215,797 A | 8/1980 | Chen | |
| 4,238,047 A | 12/1980 | Helms et al. | |
| 4,252,248 A | 2/1981 | Obrist et al. | |
| 4,258,529 A | 3/1981 | Smith | |
| 4,397,133 A | 8/1983 | Hume | |
| 4,418,834 A | 12/1983 | Helms et al. | |
| 4,438,864 A | 3/1984 | Helms | |
| 4,442,971 A | 4/1984 | Helms | |
| 4,448,345 A | 5/1984 | Helms | |
| 4,495,749 A | 1/1985 | Faller | |
| 4,533,063 A * | 8/1985 | Buchner et al. | 220/270 |
| 4,595,117 A | 6/1986 | Walter | |
| 4,685,273 A | 8/1987 | Caner | |
| 4,692,132 A * | 9/1987 | Ikushima et al. | 493/103 |
| 4,838,008 A | 6/1989 | Hardy | |
| 5,091,231 A * | 2/1992 | Parkinson | 428/36.6 |
| 5,178,297 A * | 1/1993 | Harold | 220/612 |
| 5,246,134 A | 9/1993 | Roth et al. | |
| 5,248,134 A | 9/1993 | Ferguson | |
| 5,258,191 A | 11/1993 | Hayes | |
| 5,395,005 A * | 3/1995 | Yoshida | 220/359.2 |
| 5,511,679 A | 4/1996 | Beck | |
| 5,634,567 A * | 6/1997 | Hekal | 220/359.3 |
| 5,647,501 A | 7/1997 | Helms | |
| 5,692,635 A | 12/1997 | Farrell et al. | |
| 5,810,197 A | 9/1998 | Mazzarolo | |
| 5,911,334 A | 6/1999 | Helms | |
| 5,947,278 A | 9/1999 | Sawhney | |
| 5,950,861 A | 9/1999 | Roth et al. | |
| 5,983,607 A | 11/1999 | Mihalov | |
| 6,053,353 A | 4/2000 | Helms | |
| 6,145,689 A | 11/2000 | Kobayashi et al. | |
| 6,196,451 B1 | 3/2001 | Helms | |
| 6,234,386 B1 | 5/2001 | Drummond et al. | |
| 6,439,387 B1 | 8/2002 | Bergman | |
| 6,508,375 B1 | 1/2003 | Krall | |
| 6,523,713 B1 | 2/2003 | Helms | |
| 6,637,176 B1 | 10/2003 | Krall | |
| 6,673,303 B2 | 1/2004 | White et al. | |
| 6,749,066 B2 | 6/2004 | Bergman | |
| 6,772,901 B2 | 8/2004 | Witt | |
| 6,799,692 B2 | 10/2004 | Teixeira Alvares | |
| 6,857,561 B2 | 2/2005 | Williams | |
| 6,881,286 B2 | 4/2005 | Drummond | |
| 7,055,713 B2 | 6/2006 | Rea | |
| 7,086,545 B2 | 8/2006 | Mannion et al. | |
| 7,267,243 B2 | 9/2007 | Steg | |
| 7,311,218 B2 | 12/2007 | Varadarajan | |
| 7,584,866 B2 | 9/2009 | Selina | |
| 7,694,837 B2 | 4/2010 | Robertson et al. | |
| 7,703,626 B2 | 4/2010 | Witt | |
| 7,757,879 B2 | 7/2010 | Schuetz | |
| 7,870,967 B2 | 1/2011 | Sawyer | |
| 7,938,293 B2 | 5/2011 | Gidumal | |
| 7,968,033 B2 | 6/2011 | Mazzarolo | |
| 8,245,873 B2 | 8/2012 | Steg | |
| 8,251,239 B2 | 8/2012 | Yeung | |
| 2003/0010787 A1 | 1/2003 | Dalton | |
| 2003/0183636 A1 | 10/2003 | Shih | |
| 2004/0159080 A1 * | 8/2004 | Stewart et al. | 53/487 |
| 2005/0145632 A1 | 7/2005 | Cocca | |
| 2006/0278603 A1 | 12/2006 | Takashima et al. | |
| 2007/0108216 A1 | 5/2007 | Kurth et al. | |
| 2007/0187352 A1 | 8/2007 | Kras | |
| 2008/0110896 A1 | 5/2008 | Westphal | |
| 2008/0264961 A1 | 10/2008 | Sawyer | |
| 2009/0032535 A1 | 2/2009 | Dunwoody | |
| 2009/0302040 A1 | 12/2009 | Fox | |
| 2010/0059537 A1 | 3/2010 | Stevens | |
| 2010/0096388 A1 | 4/2010 | Kobayashi et al. | |
| 2010/0140282 A1 | 6/2010 | Steg | |
| 2011/0100990 A1 | 5/2011 | Clodfelter et al. | |
| 2012/0199599 A1 | 8/2012 | Minnette | |
| 2012/0205375 A1 | 8/2012 | Hudson | |
| 2012/0234835 A1 | 9/2012 | Minnette | |
| 2012/0270167 A1 | 10/2012 | Sato | |
| 2012/0305560 A1 | 12/2012 | Minnette | |
| 2013/0008904 A1 | 1/2013 | Minnette | |
| 2013/0032598 A1 | 2/2013 | Triquet | |
| 2013/0047559 A1 | 2/2013 | Minnette | |
| 2013/0104505 A1 | 5/2013 | Minnette | |
| 2013/0112690 A1 | 5/2013 | Jongsma | |
| 2013/0270143 A1 | 10/2013 | Muscato | |

OTHER PUBLICATIONS

International Search Report dated Jun. 20, 2012 for PCT/US2012/28010, 10 pages.
International Search Report dated May 11, 2012 for PCT/US2012/023639, 9 pages.
International Search Report and Written Opinion dated Apr. 14, 2014, relating to International Application No. PCT/US2013/070273.
International Search Report dated Jun. 20, 2012, relating to International Application No. PCT/US2012/28010.
International Search Report dated May 11, 2012, relating to International Application No. PCT/US2012/023639.
International Search Report dated Sep. 28, 2012, relating to International Application No. PCT/US2012/045965.
European Search Report for Appl. No. 12745363.7 dated Jun. 20, 2014.
International Search Report and Written Opinion dated Sep. 4, 2014, relating to International Application No. PCT/US2014/035837.
Office action dated Aug. 29, 2013 for U.S. Appl. No. 13/362,953.
Office action dated Feb. 27, 2014 for U.S. Appl. No. 13/362,953.

* cited by examiner

CANISTER

PRIORITY CLAIM

This application claims priority under 35 U.S.C. §119(e) to U.S. Provisional Application Ser. No. 61/505,441, filed Jul. 7, 2011, which is expressly incorporated by reference herein.

BACKGROUND

The present disclosure relates to canisters, and particularly to canisters having a container and a lid mounted on top of the container. More particularly, the present disclosure relates to canisters able to withstand exposure to high temperatures and pressures.

SUMMARY

A canister in accordance with the present disclosure includes a container including a body formed to include an interior region for storing fluid or solid products and a brim coupled to an upper portion of the body. The canister further includes a closure adapted to be coupled to the brim to close a mouth formed in the container to open into the interior region.

In illustrative embodiments, the brim includes a radially inwardly facing inner side edge aligned with the mouth formed in the container and a radially outwardly facing outer side edge. The brim also includes a top wall arranged to interconnect upper portions of each of the inner and outer side edges and face away from a floor included in the body and arranged to underlie the interior region.

In illustrative embodiments, the closure includes an outer rim having a radially inwardly facing side wall and a radially inwardly extending retainer lip coupled to a lower end of the radially facing side wall. To retain the closure on the container in a position closing the mouth of the container, the radially inwardly facing side wall of the outer rim is bonded chemically to the radially outwardly facing outer side edge of the container brim. In illustrative embodiments, the radially inwardly extending retainer lip is arranged to extend under the brim of the container and toward the body of the container and anchored mechanically to the underside of the container brim.

In illustrative embodiments, the container is a multi-layered structure having an inner layer, an outer layer, and one or more middle layers interposed between the inner and outer layers. The brim is formed to expose each of these inner, outer, and middle layers and to cause radially outwardly facing exposed end portions of the inner, outer, and middle layers to cooperate to form the radially outwardly facing outer side edge of the brim. When the closure is mounted on the container brim, the radially inwardly facing side wall of the outer rim of the closure is bonded chemically to the exposed end portions of each of the inner, outer, and middle layers included in the container brim.

A process for forming a canister in accordance with the present disclosure comprises the steps of heating an outer rim of a closure while the outer rim is arranged to lie in closely confronting relation to a radially outwardly facing outer side edge of a brim of a container and applying a force to the heated outer rim to cause a heat-activated sealant layer included in the outer rim to mate with and bond chemically to the radially outwardly facing outer side edge of the brim in the presence of external heat and pressure to establish a hermetic seal between the outer rim of the closure and the brim of the container and establish a sealed chamber between the closure and the container. In illustrative embodiments, the heat-activated sealant layer is bonded chemically to a topside of the brim and/or an underside of the brim and/or to one or more of several layers of plastics material that cooperates to form the container. In illustrative embodiments, the process further comprises the step of applying a force to a retainer lip that is coupled to a free end of the outer rim to cause the retainer lip to move toward a body included in the container and formed to include an interior product-storage region and mating the retainer lip with an underside of the brim to establish a mechanical bond between the closure and the container.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
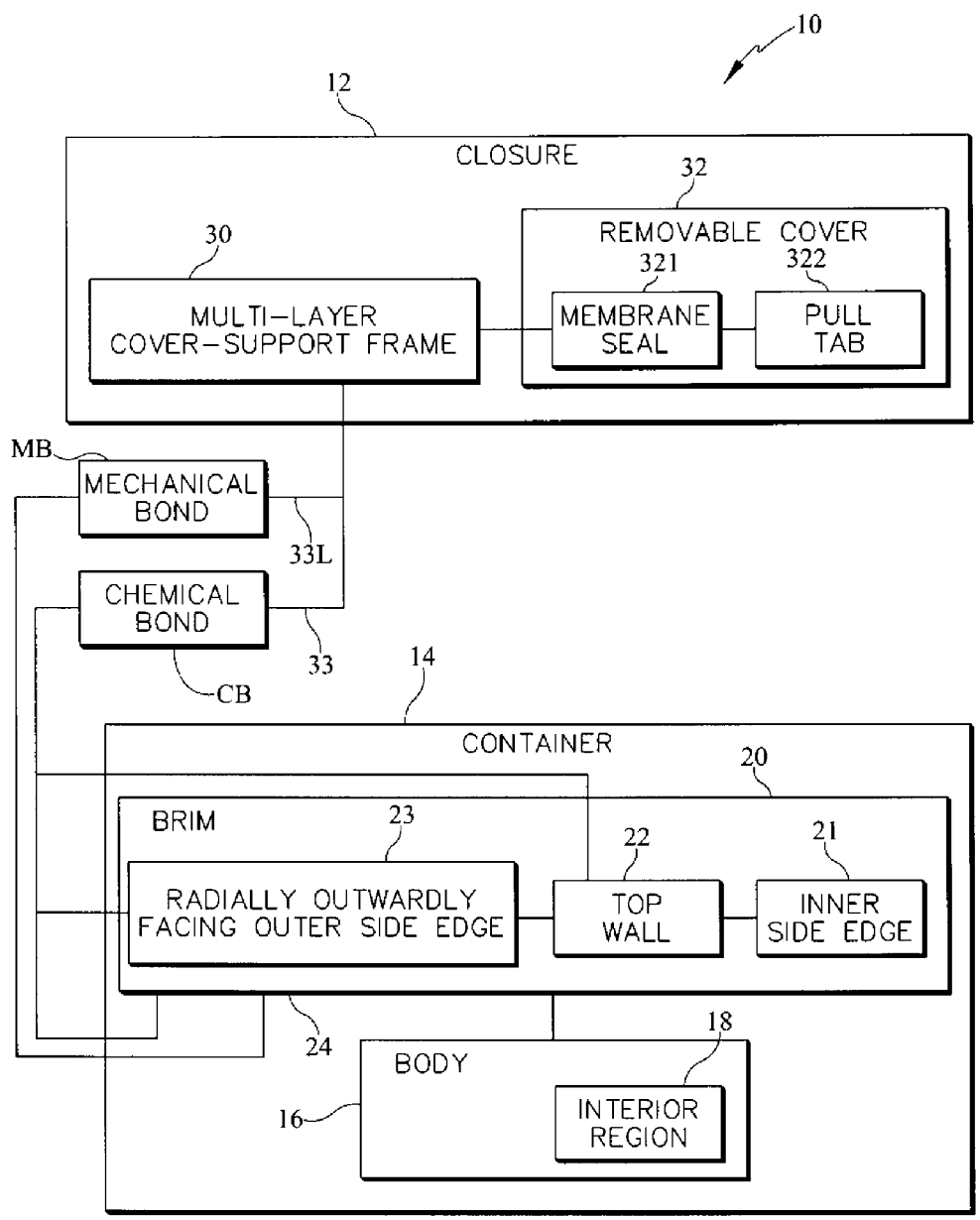
FIG. 1 is a diagrammatic illustration of a canister in accordance with a first embodiment of the present disclosure suggesting that a multi-layer cover-support frame configured to support a removable cover to provide a container closure is mated by a chemical bond to an exposed radially outwardly facing side outer edge of a brim included in a companion container, a topside of the brim, and an underside of the brim, and is mated to an underside of the brim by a mechanical bond so as to establish a sealed canister able to withstand exposure to relatively high temperatures and pressures.

A canister 10 in accordance with a first embodiment of the present disclosure is shown diagrammatically in FIG. 1 and illustratively in FIGS. 2-5. Examples of rollers that are used in accordance with a process provided within the scope of the present disclosure to couple a closure 12 to a companion container 14 to establish canister 10 are shown in FIGS. 6-10. A canister 110 in accordance with a second embodiment of the present disclosure is shown diagrammatically in FIG. 11 and illustratively in FIGS. 12-14. A canister 210 in accordance with a third embodiment of the present disclosure is shown diagrammatically in FIG. 15 and illustratively in FIGS. 16-22.

A heat-activated sealant layer included as an innermost layer in an outer rim of a multi-layer frame of a container closure 12, 112, or 212 made in accordance with the present disclosure is bonded chemically in the presence of heat and external pressure to a radially outwardly facing outer side edge 23, a topside 22, and an underside 24 of a container brim 20 at a factory to establish a hermetic seal between the closure 12, 112, or 212 and the container 14 so that an interior product-storage region provided in the canister 10, 110, or 210 is sealed to provide a sealed chamber to cause the canister 10, 110, or 210 is retortable and thus able to withstand exposure to relatively high temperatures and pressures during a sterilization process carried out at the factory. In illustrative embodiments, a retainer lip also included in the multi-layer frame of container closure 12, 112, or 212 is coupled to a free end of the outer rim and is arranged to mate with the underside of the container brim 20 to anchor the container closure 12, 112, or 212 mechanically to the container brim 20.

Figure 2B:
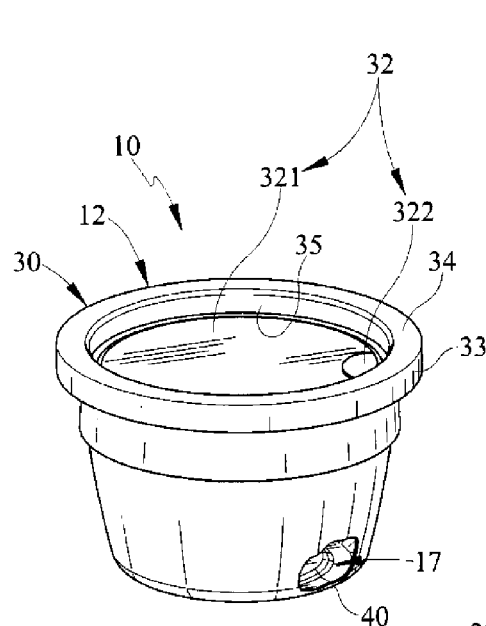
FIG. 2B is a perspective view of an illustrative canister in accordance with the present disclosure.
Figure 2A:
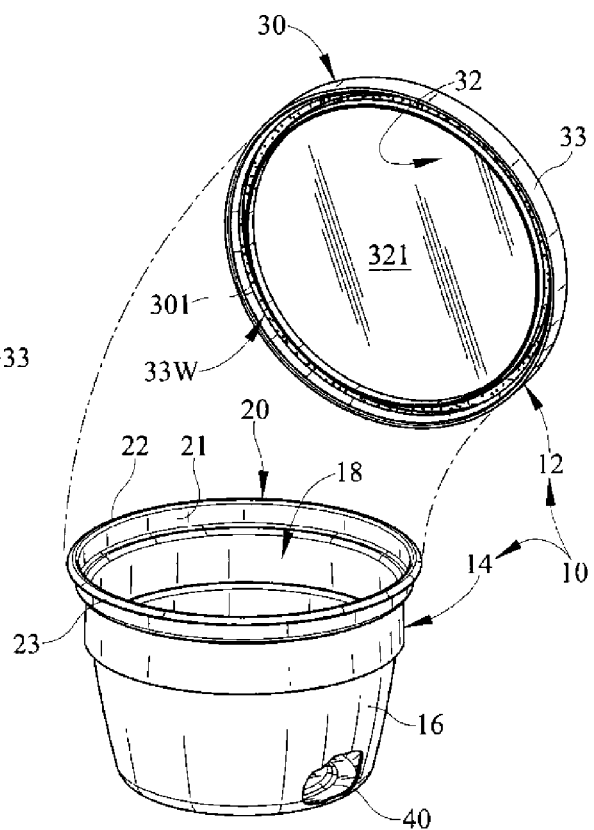
FIG. 2A is an exploded perspective assembly view showing a closure that is configured to mate with a brim of a container at a factory to produce a canister shown illustratively in FIG. 2B and diagrammatically in FIG. 1.
Figure 2C:
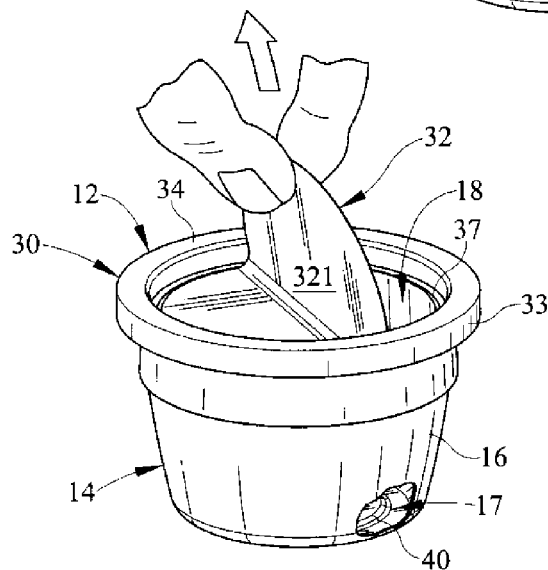
FIG. 2C is a perspective view similar to FIG. 2B showing that a removable cover included in the closure can be separated from a multi-layer cover-support frame that is coupled permanently to a brim of the container to allow a consumer to gain access to product stored in an interior region of the container.
Figure 3:
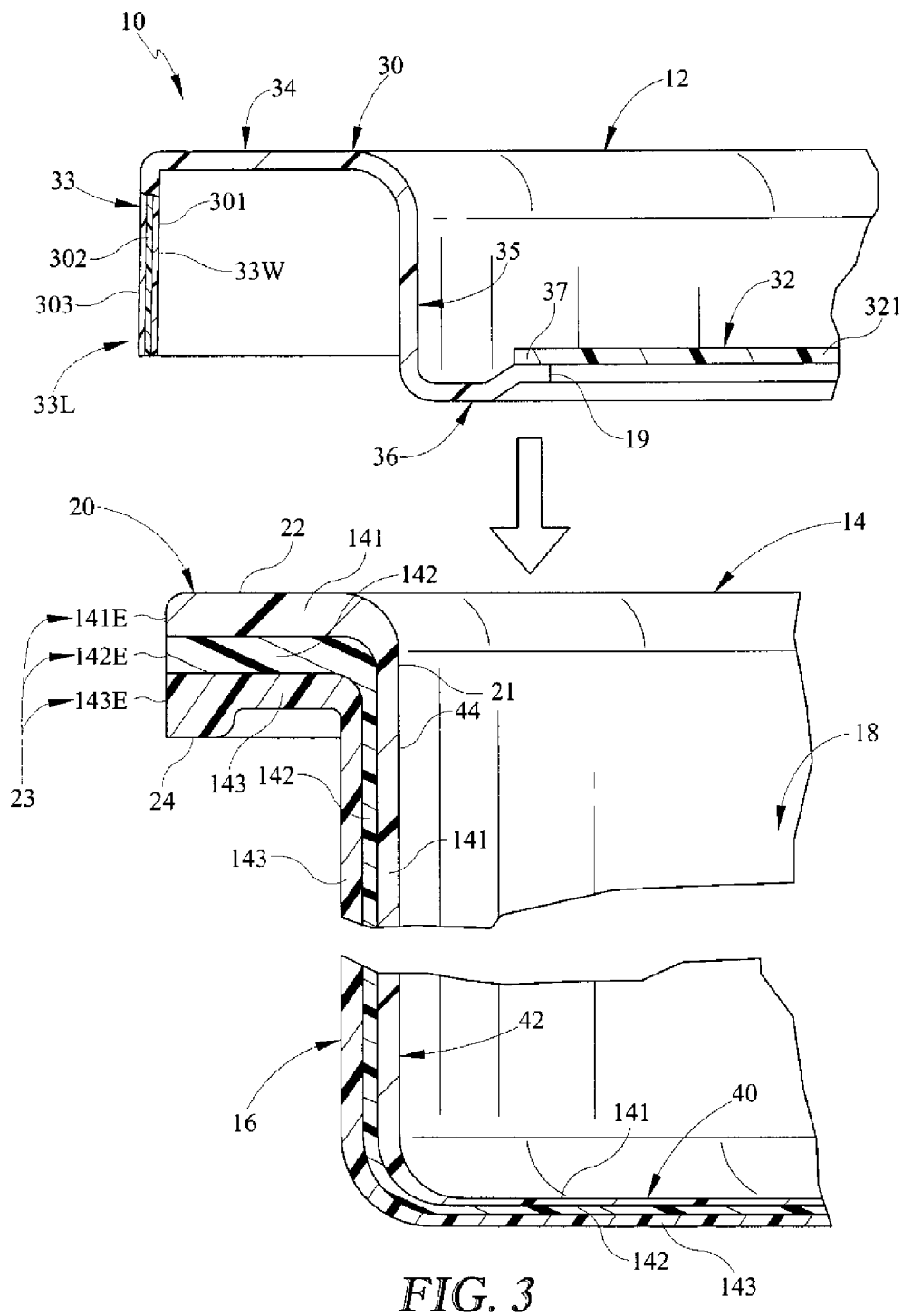
FIG. 3 is an illustrative partial sectional view of a closure of the type shown diagrammatically in FIG. 1 and illustratively in FIGS. 2A-2C as it is being moved downwardly to mate with a brim of a companion container and showing that the closure has a multi-layer structure comprising inner, middle, and outer closure layers and showing that the container has a multi-layer structure and a brim that is formed (e.g., cut) to form a striated annular radially outwardly facing outer side edge comprising exposed inner, outer, and middle layers in the multi-layer container.
Figure 4:
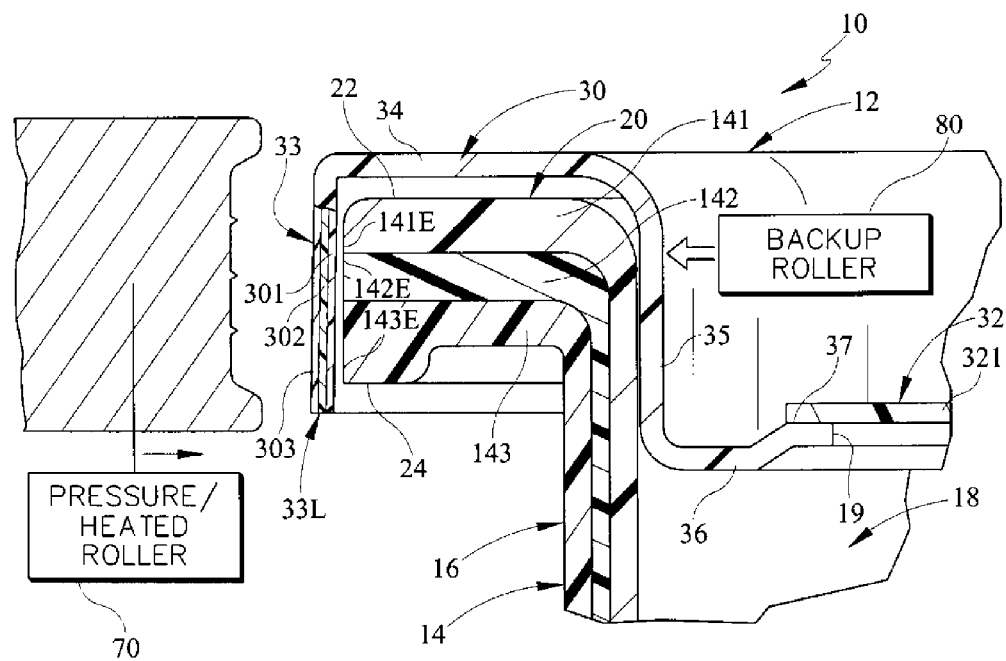
FIG. 4 is a diagrammatic view suggesting that a heated pressure-generating roller is moved (to the right) to engage an annular outer rim of the multi-layer cover-support frame of the closure while a companion back-up roller engages an annular inner rim of the multi-layer cover-support frame to apply heat and pressure to a bond area established at a junction between the annular outer rim of the multi-layer cover-support frame and the exposed layers in the radially outwardly facing outer side edge of the brim of the container and alongside the topside and underside of the brim to establish a bond between the closure and the container that is able to withstand relatively high pressures and temperatures.
Figure 5:
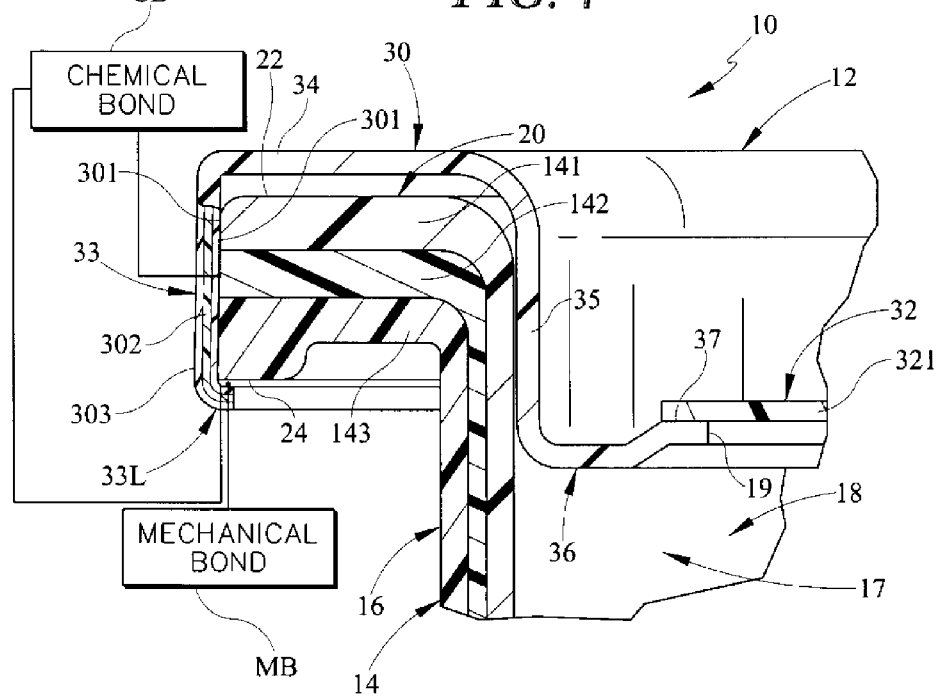
FIG. 5 is a diagrammatic view similar to FIG. 4 showing that both chemical and mechanical bonds have been established in accordance with the present disclosure to retain the closure on the brim of the container.
Figure 6:
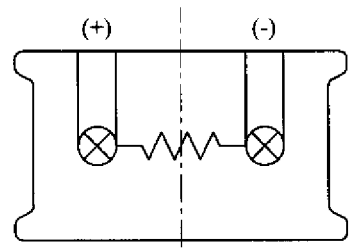
FIG. 6 is a diagrammatic view of an electric heat generator in a heated pressure-generating roller in accordance with the present disclosure.
Figure 7:
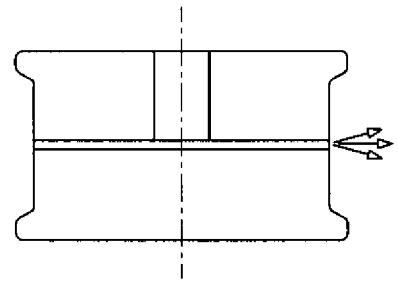
FIG. 7 is a diagrammatic view of a forced-air heat generator in a heated pressure-generating roller in accordance with the present disclosure.
Figure 8:
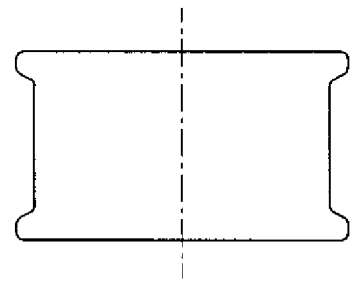
FIG. 8 is a diagrammatic view of an ultrasonic heat generator in a heated pressure-generating roller in accordance with the present disclosure.
Figure 9:
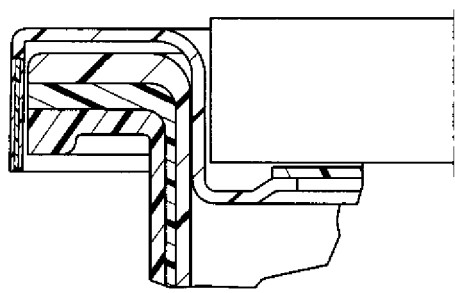
FIG. 9 is a diagrammatic view of a first embodiment of a back-up roller in accordance with the present disclosure.
Figure 10:
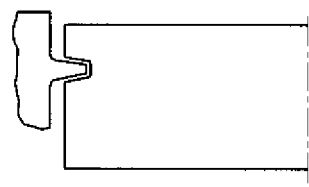
FIG. 10 is a diagrammatic view of a second embodiment of a back-up roller in accordance with the present disclosure.

In a first canister embodiment shown in FIGS. 1-5, a heat-activated sealant layer 301 in outer rim 33 of container closure 12 is bonded chemically in the presence of external heat and pressure to radially outwardly facing outer side edge 23 of container brim 20, while a portion of heat-activated sealant layer 301 in top wall 34 is bonded chemically to a topside 22 of brim 20 and a portion of heat-activated sealant layer 301 in retainer lip 33L is bonded chemically to an underside 24 of brim 20 by chemical bond CB as suggested in FIGS. 1, 4, and 5. A retainer lip 33L coupled to a lower portion of outer rim 33 is arranged to extend in a radially inward direction to mate with an underside of container brim 20 to establish a mechanical bond MB. Container closure 12 is sealed hermetically to container brim 20 to establish a sealed chamber 17 and provide a canister 10 that is retortable. Container closure 12 is coupled to container 14 at a factory to establish a hermetic seal as suggested in FIGS. 2A and 3-5. Later, a consumer can gain access to product stored in sealed chamber 17 by separating a removable cover 32 from a cover-support frame 30 that includes outer rim 33 while leaving cover-support frame 30 in place on container brim 20 in a manner suggested in FIGS. 2B and 2C.

Figure 11:
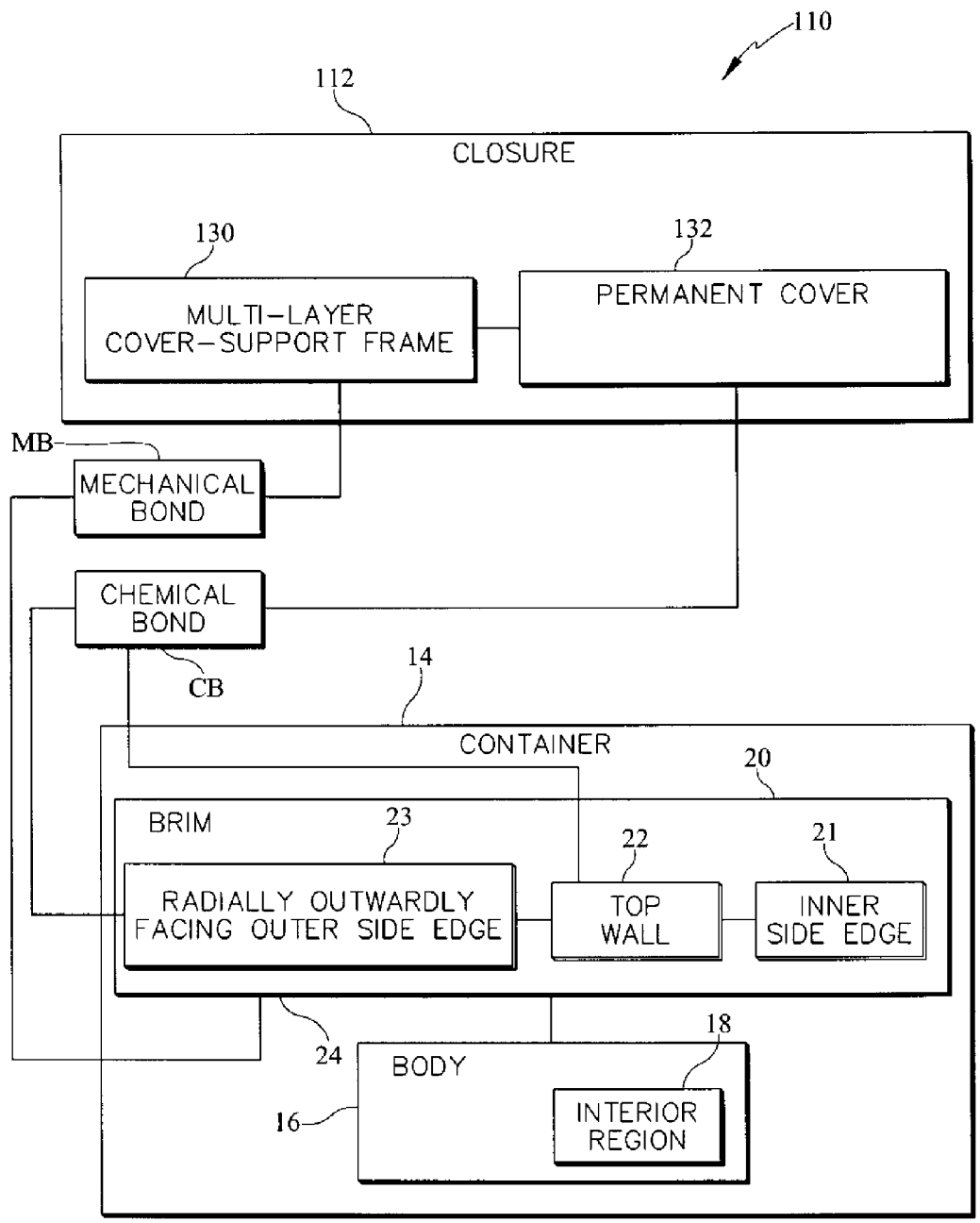
FIG. 11 is a diagrammatic illustration of a canister in accordance with a second embodiment of the present disclosure suggesting that a closure comprising a multi-layer cover-support frame and a permanent (i.e., non-removable) cover is mated by a chemical bond to an exposed radially outwardly facing outer side edge, a topside, and an underside of a brim included in a companion container to establish a sealed canister able to withstand exposure to relatively high temperatures and pressures.
Figure 12B:
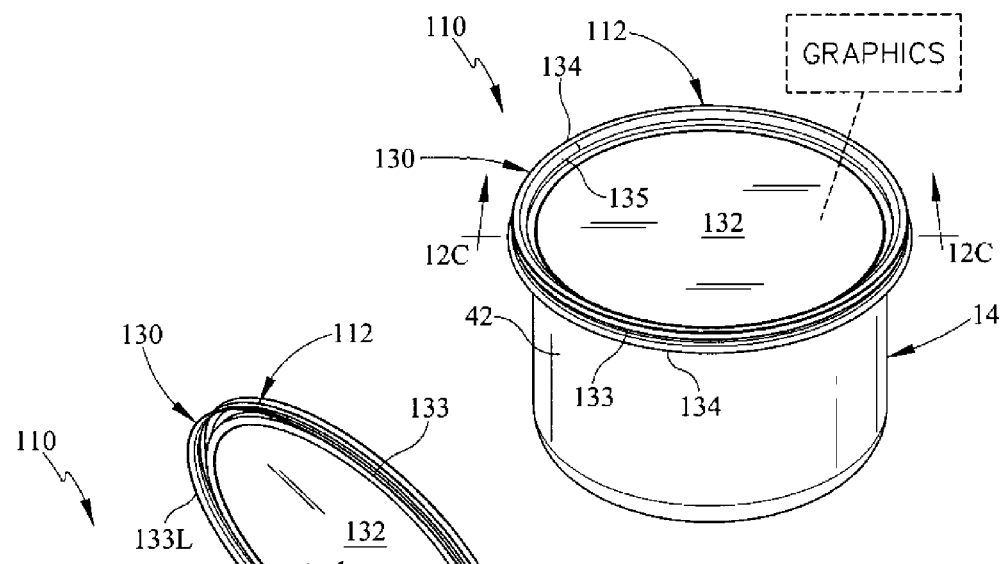
FIG. 12B is a perspective view of an illustrative canister made by mating the closure shown in FIG. 12A to the brim of the container shown in FIG. 12A.
Figure 12A:
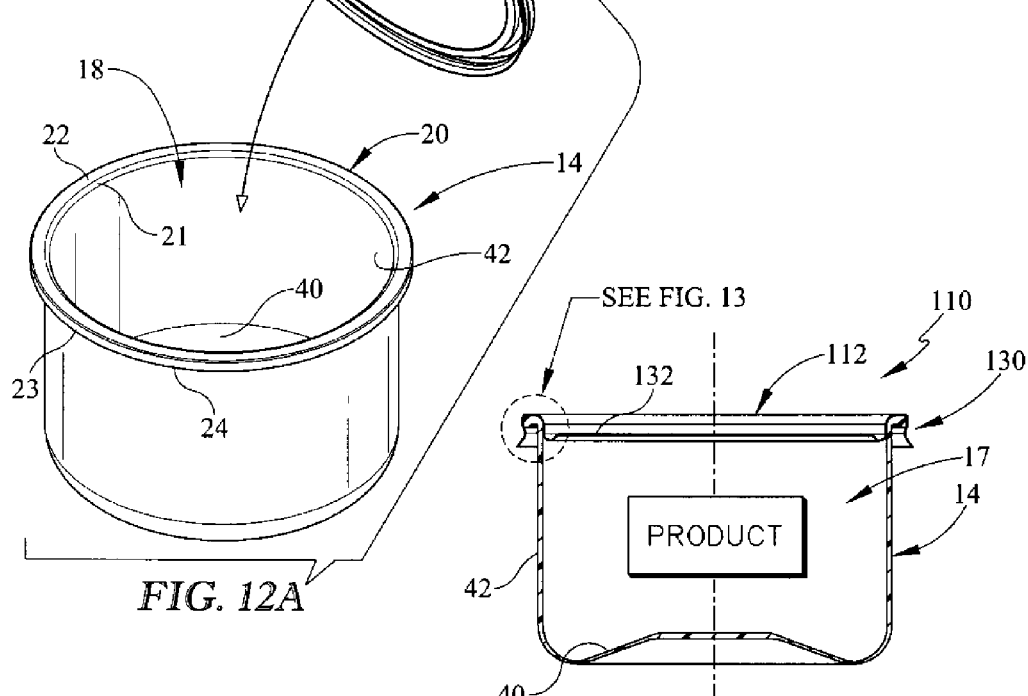
FIG. 12A is an exploded perspective assembly view showing a closure that is configured to mate with a brim of a container at a factory to produce a canister shown illustratively in FIG. 12B and diagrammatically in FIG. 11.
Figure 12C:
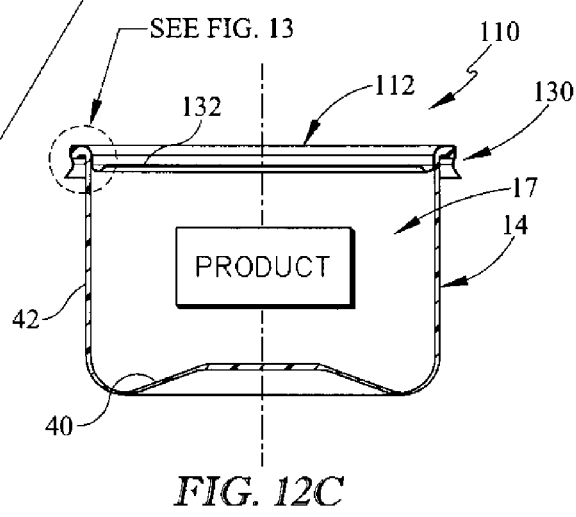
FIG. 12C is a sectional view taken along FIG. 12C-12C of FIG. 12B showing mating engagement of the multi-layer cover-support frame of the closure on the brim of the container to retain product stored in an interior product-stage region formed in the container in a sealed chamber provided between the container and the closure when the closure is mounted on the container.
Figures 13, 14:
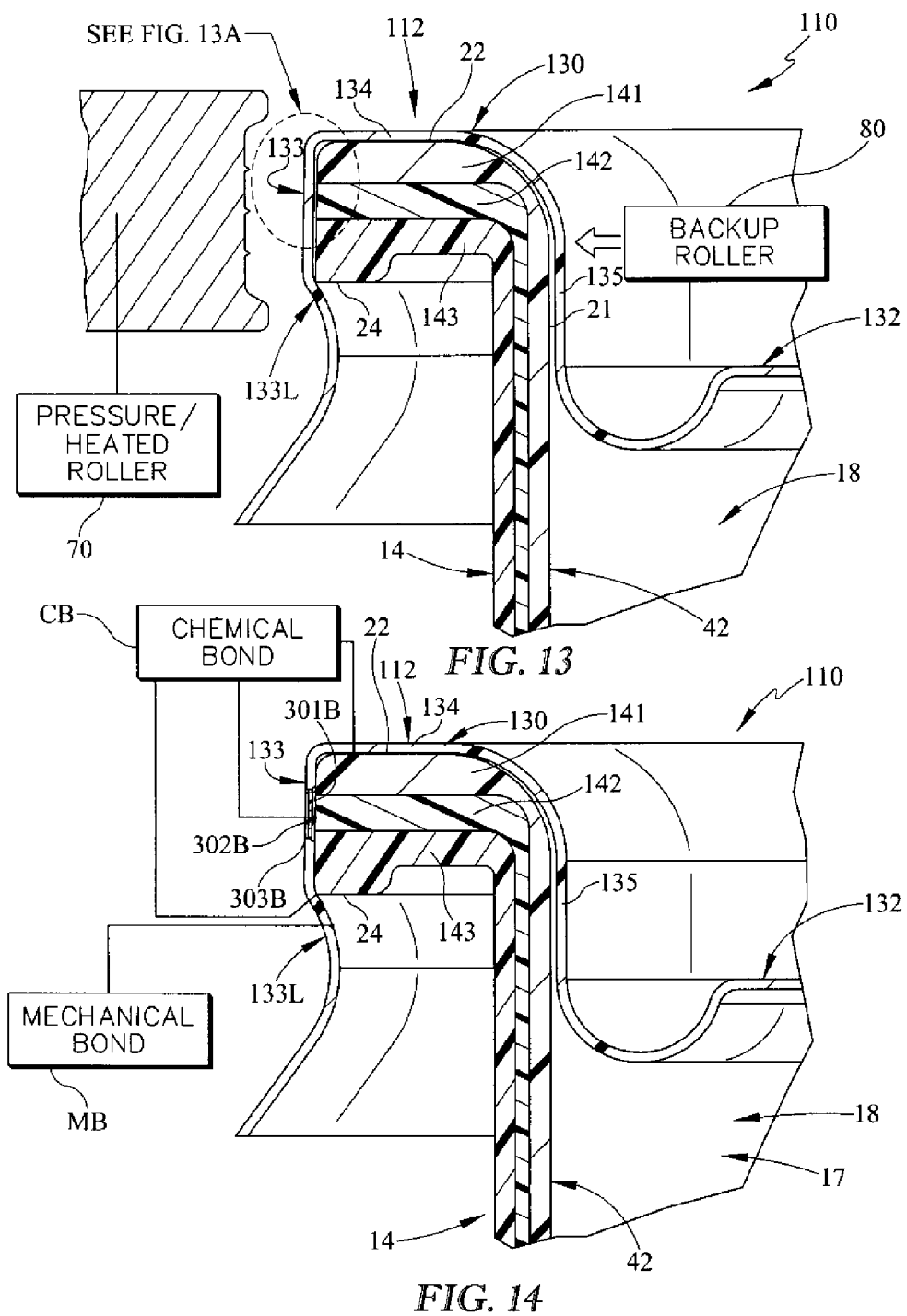
FIG. 13 is a diagrammatic view suggesting that a heated pressure-generating roller is moved to engage an annular outer rim of the multi-layer cover-support frame of the closure while a companion back-up roller engages an annular inner rim of the multi-layer cover-support frame to apply heat and pressure to a bond area established at a junction between the annular outer rim of the multi-layer cover-support frame and the exposed layers in the radially outwardly facing side edge of the brim of the container and along the topside and underside of the brim to establish a bond between the closure and the container that is able to withstand relatively high pressures and temperatures.
FIG. 14 is a diagrammatic view similar to FIG. 13 showing that both chemical and mechanical bonds have been established in accordance with the present disclosure to retain the closure on the brim of the container.
Figure 13A:
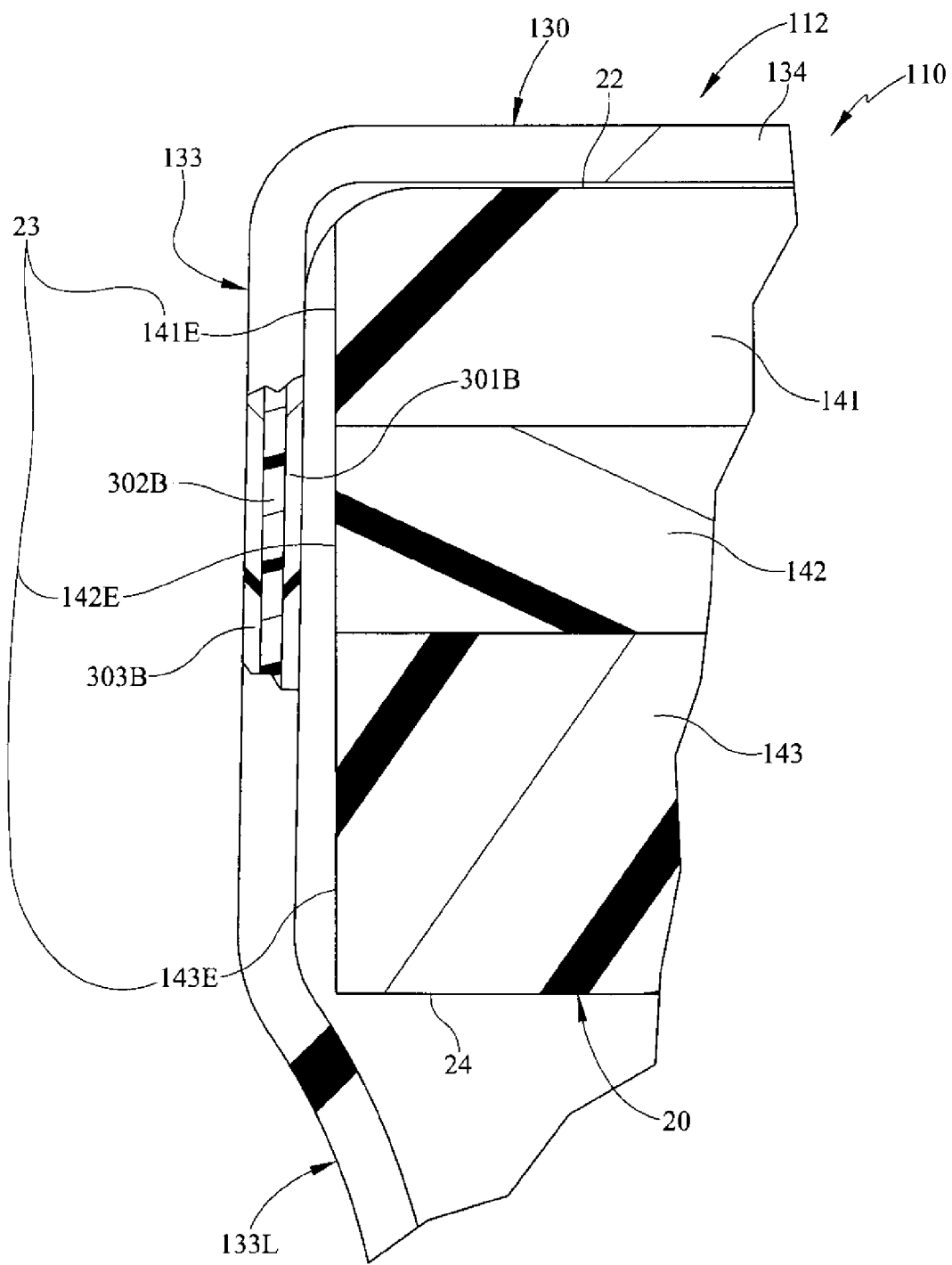
FIG. 13A is an enlarged view of a portion of the canister taken from a circled region in FIG. 13.

In a second canister embodiment shown in FIGS. 11-14, a heat-activated sealant layer 301B in outer rim 133 of container closure 112 is bonded chemically in the presence of external heat and pressure to radially outwardly facing side edge 23, while a portion of heat-activated sealant layer 301B in top wall 134 is bonded chemically to a topside 22 and a portion of heat-activated sealant layer 301B in retainer lip 133L is bonded chemically to an underside 24 of container brim 20 to establish a chemical bond CB as suggested in FIGS. 11, 13, and 14. A retainer lip 133L coupled to a lower portion of outer rim 133 is arranged to extend in a radially inward direction to mate with an underside of container brim 20 to establish a mechanical bond. Container closure 112 is sealed hermetically to container brim 20 to establish a sealed chamber 17 and provide a canister 110 that is retortable. Container closure 112 is coupled to container 14 at a factory to establish a hermetic seal as suggested in FIGS. 12A, 13, and 14. Later, a consumer can gain access to product stored in sealed chamber 17 by breaking chemical and mechanical bonds CB, MB and separating the entire closure 12 from container brim 20. In this embodiment, a cover 132 is coupled permanently to a cover-support frame 130 that includes outer rim 133 as suggested in FIGS. 11-14.

Figure 15:
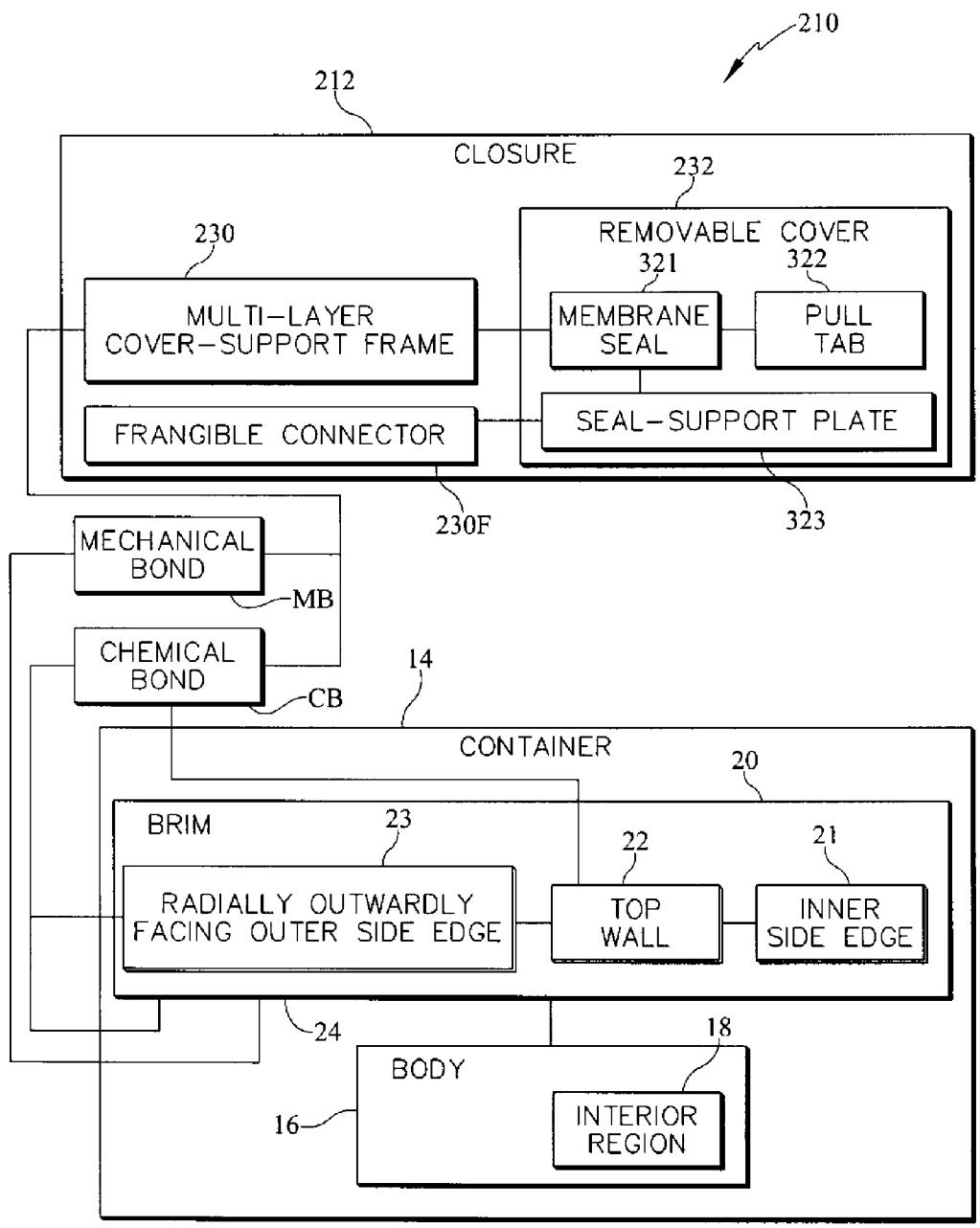
FIG. 15 is a diagrammatic illustration of a canister in accordance with yet another embodiment of the present disclosure suggesting that the removable cover of the closure further includes a seat-support plate located underneath a membrane seal and the closure further includes a frangible connector arranged to interconnect the seal-support plate and the multi-layer cover support frame.
Figure 16:
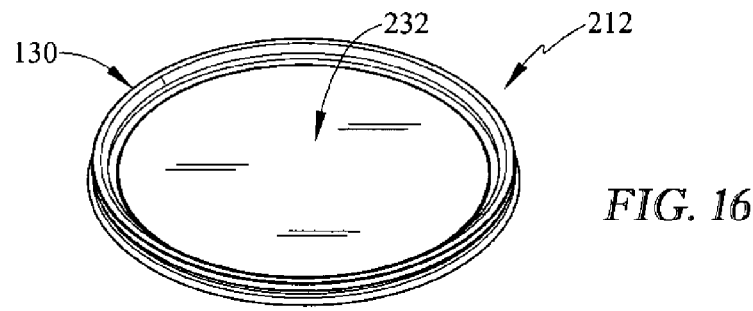
FIG. 16 is a perspective view of an illustrative closure of the type shown diagrammatically in FIG. 15.
Figure 17:
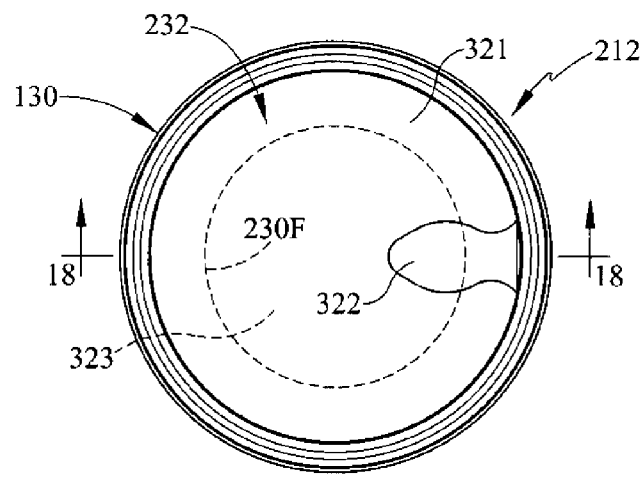
FIG. 17 is a top plan view of the closure shown in FIG. 16.
Figure 18:
FIG. 18 is a sectional view of the closure taken along line 18-18 of FIG. 17.
Figure 19:
FIG. 19 is a side elevation view of the closure of FIGS. 16 and 17.
Figure 20:
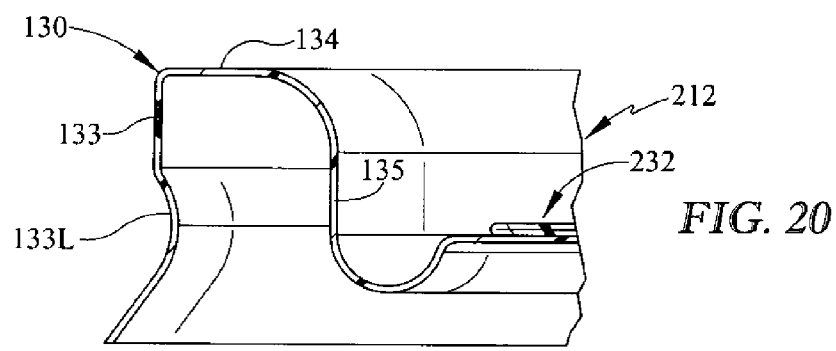
FIG. 20 is an enlarged view of a portion of the closure shown in a circled region of FIG. 18.
Figure 21:
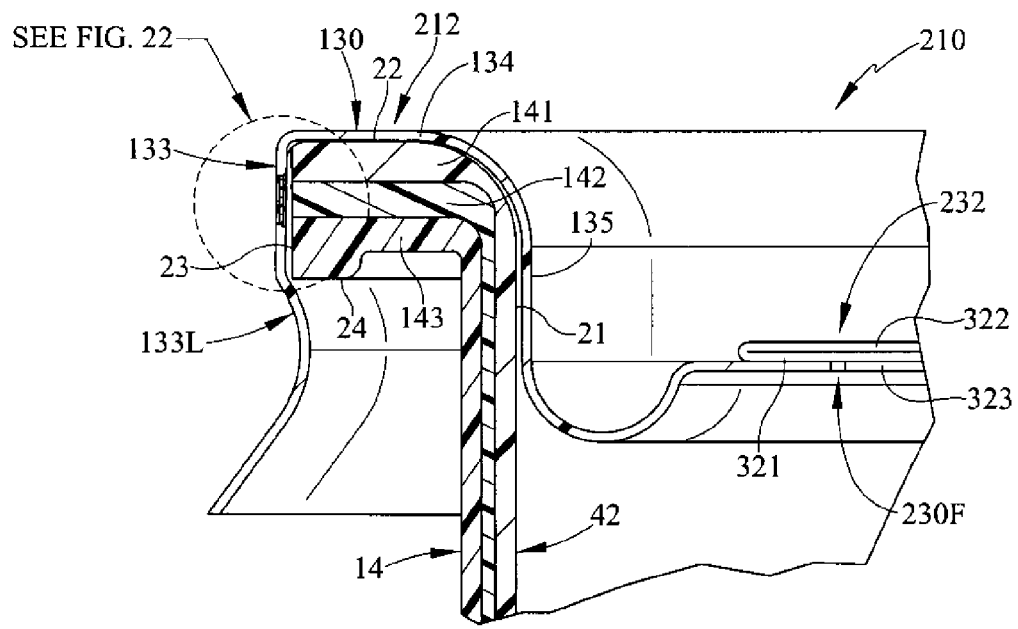
FIG. 21 is an enlarged sectional view of a portion of the closure of FIGS. 16-20 mounted on the brim of an illustrative container in accordance with the present disclosure.
Figure 22:
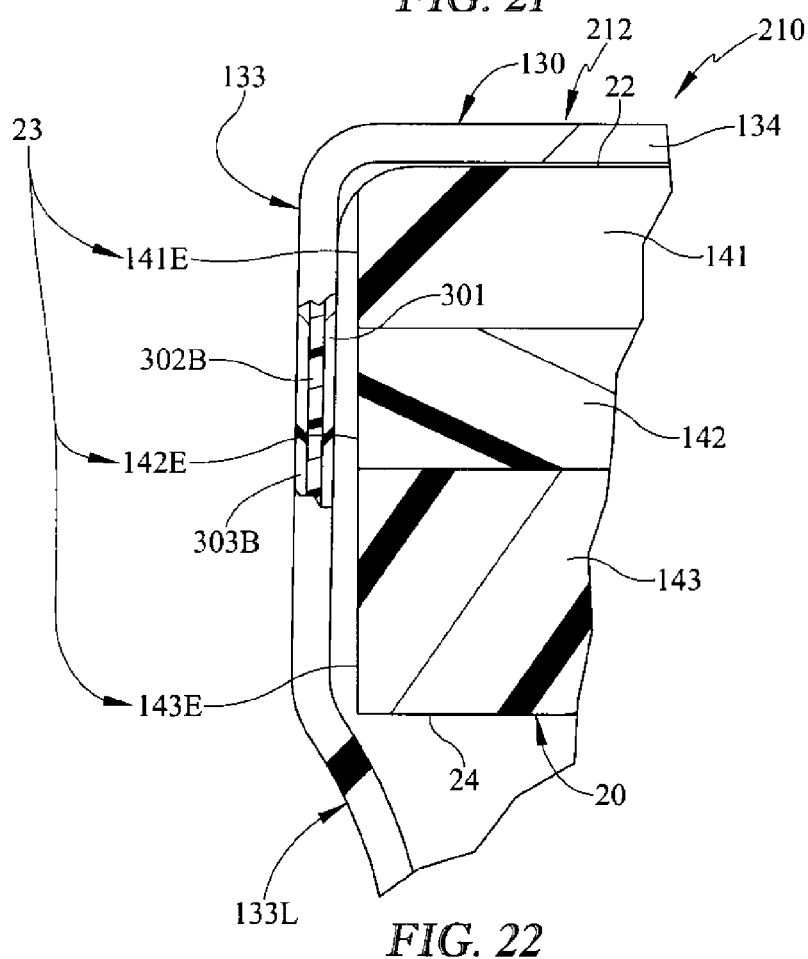
FIG. 22 is a diagrammatic view of a portion of the canister taken from a circled region in FIG. 21 showing a gap provided between an inner layer of the multi-layer cover-support frame of the closure before it is mated with three exposed layers in the radially outwardly facing side edge of the brim of the container and then exposed to heat and pressure to establish the chemical and mechanical bonds shown in FIGS. 15 and 21 so that the canister is able to withstand relatively high pressures and temperatures.

In a third canister embodiment shown in FIGS. 15-22, a heat-activated sealant layer 301B in outer rim 133 of container closure 212 is bonded chemically in the presence of external heat and pressure to radially outwardly facing side edge 23 while a portion of heat-activated sealant layer 301B in top wall 134 is bonded chemically to a topside 22 and a portion of heat-activated sealant layer in retainer lip 133L is bonded chemically to an underside 24 of container brim 20 to establish a chemical bond CB as suggested in FIGS. 15, 21, and 22. A retainer lip 133L coupled to a lower portion of outer rim 133 is arranged to extend in a radially inward direction to mate with an underside of container brim 20 to establish a mechanical bond MB. Container closure 212 is sealed hermetically to container brim 20 to establish a sealed chamber and provide a canister 210 that is retortable. Container closure 212 is coupled to container 14 at a factory to establish a hermetic seal as suggested in FIGS. 21 and 22. Later, a consumer can gain access to product stored in the sealed chamber by separating a removable cover 232 comprising a seal-support plate 323, a membrane seal 321, and a pull tab 322 from a cover-support frame 230 that includes outer rim 233.

Each canister 10, 110, and 210 disclosed herein is a high-temperature retortable barrier package configured to seal contents under high-temperature and high-pressure sterilization and microwave cooking and does not allow transmission of oxygen or moisture in accordance with illustrative embodiments. Each container and closure in canisters 10, 110, and 210 is made entirely of plastics materials in illustrative embodiments. In illustrative embodiments, the heat-activated sealant layer in each of closures 12, 112, and 212 is, for example, made of a polymeric material configured to bond to container 14 under heat and pressure to block ingress of oxygen and other contaminants into sealed chamber 17. Each layer included in closures and containers disclosed herein is made of a plastics material having suitable sealant, solid-transmission barrier, and liquid-transmission barrier properties.

Canister 10 in accordance with a first canister embodiment includes a closure 12 and a container 14 as suggested diagrammatically in FIG. 1 and illustratively in FIGS. 2-5. Container 14 includes a body 16 formed to include an interior region 18 and a brim 20 coupled to an upper portion of body 16. Closure 12 includes a cover-support frame 30 adapted to be coupled to container brim 20 and formed to include a product-discharge aperture 19 as suggested in FIGS. 3-5 opening into interior region 18 formed in body 16 when closure 12 is mounted on container 14. Closure 12 also includes a removable cover 32 coupled to cover-support frame 30 to close the product-discharge aperture 19 temporarily during canister shipment and storage as suggested in FIGS. 2B and 5 until a consumer later wishes to gain access to product stored in a sealed chamber 17 that is generally coextensive with interior region 18 formed in container body 16 as suggested in FIG. 2B.

Container brim 20 has an annular shape in an illustrative embodiment as suggested in FIG. 2A. Brim 20 includes a radially inwardly facing inner side edge 21, a radially outwardly facing outer side edge 23, and a top wall 22 arranged to interconnect upper portions of each of the inner and outer side edges 21, 23 and provide a topside as suggested in FIG. 3. Brim 20 also includes a downwardly facing underside 24 as shown in FIG. 3.

Container body 16 includes a floor 40 and an annular side wall 42 rising upwardly from floor 40 to form interior region 18 and mate with brim 20 as shown, for example, in FIG. 3. Side wall 42 of body 16 is formed to include a mouth 44 opening into interior region 18 as suggested in FIG. 3.

Container 14 is a multi-layer structure in an illustrative embodiment as suggested in FIG. 3. Container 14 includes an inner layer 141, an outer layer 143, and one or more middle layers 142 interposed between inner and outer layers 141, 143. Each of these layers 141-143 is included in brim 20, container floor 40, and container side wall 42 as shown in FIG. 3. Annular exposed outer portions 141E, 142E, 143E of layers 141, 142, 143, respectively, cooperate to form radially outwardly facing outer side wall 23 of brim 20 as shown, for example, in FIG. 3. Each of layers 141-143 is made of a plastics material in an illustrative embodiment.

Cover-support frame 30 of closure 12 includes an annular outer rim 33, an annular inner rim 35, an annular top wall 34 interconnecting upper portions of outer and inner rims 33, 35, and a cover foundation 36 coupled to inner rim 35 and arranged to overlie interior product-storage region 18 as shown, for example, in FIGS. 3-5. Cover foundation 36 is formed to include product-discharge aperture 19 and a top wall 37 mating with an underside of removable cover 32 to close product-discharge aperture 19 as suggested in FIG. 5. Cover-support frame 30 is a multi-layer structure in an illustrative embodiment and includes an inner closure layer 301, an outer closure layer 303, and one or more middle closure layers 302 as shown, for example, in FIG. 3. Each of outer rim 33, top wall 34, inner rim 35, and cover foundation 36 comprises each of the closure layers 301, 302, and 303 in an illustrative embodiment. In an illustrative embodiment, outer and middle closure layers 303, 302 are solid-transmission and/or fluid-transmission barrier layers and inner closure layer 301 is a heat-activated sealant layer configured to establish a hermetic seal with radially outwardly facing outer side edge 23 of container brim 20 when exposed to external heat and pressure in accordance with the present disclosure. Each of closure layers 301-303 is made of a plastics material in an illustrative embodiment.

Container body 16 is formed to include an interior region 18 for storing fluid or solid products as suggested in FIGS. 2A and 3. Container brim 20 is coupled to an upper portion of body 16 to form canister 10 as suggested in FIGS. 3-5 and to establish a sealed chamber 17 that is hermetically sealed as suggested in FIGS. 2B and 5. Canister 10 further includes a closure 12 adapted to be coupled to container brim 20 at a factory to close a mouth formed in container 14 to open into the interior region 18 and to establish the hermetic seal between closure 12 and container 14 to provide sealed chamber 17. Such a seal causes canister 10 to be retortable and withstand exposure to relatively high temperatures and pressures during sterilization of canister 10 and microwave cooking of contents in canister 10.

Removable cover 32 of closure 12 includes a membrane seal 321 and a pull tab 322 coupled to membrane seal 321 in an illustrative embodiment as suggested in FIGS. 2C and 3-5. Membrane seal 321 includes a perimeter border bonded temporarily to top wall 37 of cover foundation 36 of cover-support frame 30 to close product-discharge aperture 19 as suggested in FIGS. 2B and 3. To open aperture 19, a consumer pulls outwardly on pull tab 322 to separate membrane seal 321 from top wall 37 of cover foundation 36 as suggested in FIG. 2C.

Container brim 20 includes a radially inwardly facing inner side edge 21 aligned with the mouth 44 formed in container 14 and a radially outwardly facing outer side edge 23. Brim 20 also includes a top wall 22 arranged to interconnect upper portions of each of inner and outer side edges 21, 23 and face away from a floor 40 included in body 16 and arranged to underlie interior region 18.

Closure 12 includes an outer rim 33 having a radially inwardly facing side wall 33W defined by heat-activated sealant layer 301 and a radially inwardly extending retainer lip 33L coupled to a lower end of radially facing side wall 33W as suggested in FIG. 3. To retain closure 12 on container 14 in a position closing the mouth of container 14, the radially inwardly facing side wall 33W of outer rim 33 provided by heat-activated sealant layer 301 is bonded chemically by chemical bond CB to the radially outwardly facing outer side edge 23 of container brim 20 and the radially inwardly extending retainer lip 33L is arranged to extend under brim 20 of container 14 and toward body 16 of container 14 and is anchored mechanically by mechanical bond MB to the underside 24 of container brim 20 as suggested in FIG. 5. It is within the scope of this disclosure to bond portions of heat-activated sealant layer 301 in frame 30 to topside 22 of brim 20 and underside 24 of brim 20.

In illustrative embodiments, container 14 is a multi-layered structure having an inner layer 141, an outer layer 143, and one or more middle layers 142 interposed between the inner and outer layers 141, 143. Container brim 20 is formed to expose each of these inner, outer, and middle layers 141, 143 and to cause radially outwardly facing exposed end portions 141E, 142E, and 143E of the inner, outer, and middle layers 141-143 to cooperate to form the radially outwardly facing outer side edge 23 of container brim 20. When closure 12 is mounted on container brim 20, radially inwardly facing side wall 33W of outer rim 33 of closure 12 provided by sealant layer 301 is bonded chemically by chemical bond CB to the exposed end portions 141E, 142E, and 143E of each of inner, outer, and middle layers 141-143 included in container brim 20 as suggested in FIG. 5. Also, portions of heat-activated seal layer 301 in top wall 24 and retainer lip 33L of frame 30 are bonded to brim 20.

A diagrammatic view provided in FIG. 4 suggests that a heated pressure-generating roller 70 is moved to engage annular outer rim 33 of cover-support frame 30 of closure 12 while a companion back-up roller 80 engages annular inner rim 35 of cover-support frame 30 to apply heat and pressure to a bond area established at a junction between annular outer rim 33 of cover-support frame 30 and exposed end portions 141E, 142E, and 143E of layers 141-143 in the radially outwardly facing outer side edge 23 of container brim 20 of container 14 to establish a chemical bond CB between closure 12 and container 14 that is able to withstand relatively high pressures and temperatures during, for example, canister sterilization and microwave cooking. Both chemical and mechanical bonds CB, MB have been established in accordance with the present disclosure to retain closure 12 on brim 20 of container 14 as suggested in FIG. 5.

A heated pressure-generating roller 70 is used in accordance with the present disclosure to apply heat and pressure to annular outer rim 33 of closure 12 at a bond area established at the junction between annular outer rim 33 and outer side edge 23 of brim 20 to top wall 34 above topside 22 of brim 20, and to retainer lip 33L near underside 22 of brim 20, as suggested in FIG. 4. It is within the scope of the present disclosure to generate heat in roller 70 in any suitable way. A diagrammatic view is provided in FIG. 6 of an electric heat generator in a heated pressure-generating roller 70 in accordance with the present disclosure. A diagrammatic view is provided in FIG. 7 of a forced-air heat generator in a heated pressure-generating roller in accordance with the present disclosure. A diagrammatic view is provided in FIG. 8 of an ultrasonic heat generator in a heated pressure-generating roller in accordance with the present disclosure.

A canister 10 made in accordance with the present disclosure provides a retortable canister in that it is made by a process that uses heat and pressure applied by opposing rollers 70, 80 or other suitable heat and pressure generators to connect mechanically and bond chemically components (e.g., closure 12 and container 14) to one another. The process in accordance with the present disclosure establishes a canister 10 (or 110 or 210) that is able to withstand relatively high pressures and temperatures and is characterized by moisture, oxygen, and microbial barriers. This process provides a hermetic seal using multi-layer high-temperature barrier materials that is adapted to work with existing capping equipment by applying heat to canister components while pressing and or forming those canister components and bonding plastic material structures in those canister components.

A back-up roller 80 is provided to engage annular inner rim 35 of frame 30 of closure 12 to provide a reaction surface when heat and pressure are applied by roller 70 to annular outer rim 33 of frame 30 as suggested in FIG. 4. A diagrammatic view is provided in FIG. 9 of a first embodiment of a back-up roller in accordance with the present disclosure. A diagrammatic view is provided in FIG. 10 of a second embodiment of a back-up roller in accordance with the present disclosure.

Canister 10 comprises a container 14 and a closure 12 as suggested in FIGS. 2 and 3. Container 14 includes a body 16 formed to include an interior product-storage region 19 and a brim 20 coupled to an upper portion of body 16 to surround interior product-storage region 19. Closure 12 is arranged to mate with brim 20 to close an opening into interior product-storage region 19 to establish a hermetically sealed chamber 17 between container 14 and closure 12 as suggested in FIGS. 3-5. Closure 12 includes a frame 30 coupled to brim 20 and a heat-activated sealant layer 301 included in frame 30 is bonded chemically to a radially outwardly facing outer side edge 23, topside 22, and underside 24 of brim 20 in the presence of external heat and pressure to retain frame 30 in a stationary position on brim 20 of container 14.

Container 14 is a multi-layered structure comprising an inner layer 141 defining a boundary of interior product-storage region 19 and a topside 22 of brim 20, an outer layer 143 providing an exterior surface, and a middle layer 142 interposed between and mated to inner and outer layers 141, 143 as suggested in FIG. 3. Brim 20 is formed to expose each of these inner, outer, and middle layers 141-143 of container 14 and to cause radially outwardly facing exposed end portions 141E, 142E, 143E of inner, outer, and middle layers 141-143 of container 14 to cooperate to form the radially outwardly facing outer side edge 23 of brim 20. Heat-activated sealant layer 301 included in frame 30 of closure 12 is bonded chemically in the presence of external heat and pressure to the radially outwardly facing exposed end portions 141E, 142E, 143E of each of inner, outer, and middle layers 141-143 of container 14 included in brim 20 and to topside 22 and underside 24 of brim 20.

Frame 30 of closure 12 further includes an outer closure layer 303 providing an exterior surface and a middle closure layer 302 interposed between and mated to the heat-activated sealant and outer closure layers 301, 303 as suggested in FIG. 3. Frame 30 includes an outer rim 33 comprising portions of the heat-activated sealant layer 301, outer closure layer 303, and middle closure layer 302. Heat-activated sealant layer 301 of outer rim 33 of frame 33 is bonded chemically in the presence of external heat and pressure to the radially outwardly facing exposed end portions 141E, 142E, 143E of each of inner, outer, and middle layers 141-143 of container 14 included in brim 20. Heat-activated sealant layer 301 of top wall 34 is bonded to topside 22 of brim 20. Heat-activated sealant layer 301 of retainer lip 33L is bonded chemically to underside 24 of brim 20.

Frame 30 further includes a top wall 34 comprising portions of the heat-activated sealant layer 301, middle closure layer 302, and outer closure layer 303 as shown, for example, in FIG. 3. Top wall 34 is coupled to outer rim 33, and the portion of the heat-activated sealant layer 301 included in the top wall is arranged to mate with and bond chemically to a portion of inner layer 141 of container 14 that is arranged to provide topside 22 of brim 20.

Frame 30 further includes an inner rim 35 surrounded by outer rim 33 and arranged to lie in spaced-apart relation to outer rim 33 and a top wall 34 arranged to interconnect inner and outer rims 33, 35. Top wall of frame 30 is arranged to mate with the topside 22 of brim 20. Inner rim 35 of frame 30 is arranged to lie in spaced-apart relation to outer rim 33 of frame 30 to locate brim 20 of container 14 therebetween. Outer closure layer 303 of inner rim 35 is configured to provide engagement means for engaging a back-up roller 80 to limit movement of closure 12 relative to container 14. Outer closure layer 303 of outer rim 33 is configured to provide means for receiving heat and pressure generated by a heated pressure-generating roller 70 while back-up roller 80 engages outer closure layer 303 of inner rim 35 to apply heat and pressure to outer rim 33 at a bond area established at a junction between the heat-activated sealant layer 301 of frame 30 of closure 12 and radially outwardly facing exposed end portions 141E, 142E, 143E of inner, outer, and middle layers 141-143 of container 14 to bond the heat-activated sealant layer 301 of frame 30 of closure 14 to each of the radially outwardly facing exposed end portions 141E, 142E, 143E of inner, outer, and middle layers 141-143 of container 14. Inner rim 35 of frame 30 comprises portions of the heat-activated sealant layer 301, the outer closure layer 303, and middle closure layer 302. The portion of outer closure layer 303 included in inner rim 35 is arranged to provide the engagement means.

Frame 30 includes an outer rim 33 having a radially inwardly facing side wall 33W facing toward the radially outwardly facing exposed end portions 141E, 142E, 143E of each of inner, outer, and middle layers 141-143 of container 14. Outer rim 33 includes a portion of the heat-activated sealant layer 301 of outer rim 33 that is bonded chemically to the radially outwardly facing exposed end portions 141E, 142E, 143E of inner, outer, and middle layers 141-143 of container 14. Frame 30 further includes a retainer lip 33L coupled to a free end of outer rim 33 and arranged to extend radially inwardly under brim 20 and toward body 16 of container 14 and anchored mechanically and bonded chemically to an underside 24 of brim 20 and chemically to underside 24 of brim 20.

Brim 20 includes a topside arranged to lie above and in spaced-apart relation to the underside 24. The radially outwardly facing outer side edge 23 of brim 20 defined by the radially outwardly facing exposed end portions 141E, 142E, 143E of each of inner, outer, and middle layers 141-143 of container 14 is arranged to interconnect the topside 22 of brim 20 and the underside 24 of brim 20. Topside 22 is defined by a portion of inner layer 141 of container 14. The underside 24 is defined by a portion of outer layer 143 of container 14. Frame 30 of closure 12 further includes a top wall 34 coupled to outer rim 33 and configured to include a portion of the heat-activated sealant layer 301 that is arranged to mate with the topside 22 of brim 20 of container 14. Heated pressure-generating roller 70 is also operated to bond a portion of heat-activated layer 301 of top wall 34 of frame 30 to topside 22 of brim 28 and retainer lip 33L to underside 24 of brim 28 as suggested in FIGS. 1, 4, and 5.

Frame 30 further includes an outer closure layer 303 arranged to form an exterior surface of frame 30 and a middle closure layer 302 interposed between the heat-activated sealant and outer closure layers 301, 303 of outer rim 33. Each of outer and middle closure layers 303, 302 of frame 30 is one of a solid-transmission barrier layer and a fluid-transmission barrier layer.

Outer closure layer 303 of inner rim 35 is configured to provide engagement means for engaging a back-up roller 80 to limit movement of closure 12 relative to container 14. Outer closure layer 303 of outer rim 33 is configured to provide means for receiving heat and pressure generated by a heated pressure-generating roller 70 while back-up roller 80 engages outer closure layer 303 of inner rim 35 to apply heat and pressure to outer rim 33 at a bond area established at a junction between the heat-activated sealant layer 301 of frame 30 of closure 12 and the radially outwardly facing exposed end portions 141E, 142E, 143E of the inner, outer, and middle layers 141-143 of container 14 to bond the heat-activated sealant layer 301 of outer rim 33 of frame 30 of closure 12 to each of the radially outwardly facing exposed end portions 141E, 142E, 143E of inner, outer, and middle layers 141-143 of container 14 and to move retainer lip 33L of frame 30 of closure 12 relative to outer rim 33 in a radially inward direction toward body 16 of container 14 to be anchored mechanically to the underside of brim 20 of container 14.

Heat-activated sealant layer 301 of frame 30 is bonded chemically to a radially outwardly facing exposed end portion of a first of inner, outer, and middle layers 141-142. Heat-activated sealant layer 302 of frame 30 is bonded chemically to a radially outwardly facing exposed end portion of a second of inner, outer, and middle layers 141-143. Heat-activated sealant layer 301 of frame 30 is bonded chemically to a radially outwardly facing exposed end portion of a third of inner, outer, and middle layers 141-143.

Closure 12 further includes a removable cover 32 coupled to frame 30 to close product-discharge aperture 19 temporarily until a consumer later wishes to gain access to product stored in interior product-storage region 19 formed in container body 16. Frame 30 includes a cover foundation 36 surrounded by and coupled to inner rim 35 and formed to include product-discharge aperture 19 and to mate with an underside of removable cover 32 to close product-discharge aperture 19. Inner rim 35 is configured to provide engagement means for engaging a back-up roller 80 to limit movement of closure 12 relative to container 14.

Outer rim 33 is configured to provide means for receiving heat and pressure generated by a heated pressure-generating roller 70 while back-up roller 80 engages inner rim 35 to apply heat and pressure to the outer rim at a bond area established at a junction between the heat-activated sealant layer 301 of outer rim 33 of frame 30 of closure 12 and the radially outwardly facing outer side edge 23 of brim 20 to bond the heat-activated sealant layer 301 of outer rim 33 to the radially outwardly facing outer side edge 23 of brim 20. Frame 30 further includes a retainer lip 33L coupled to outer rim 33 and arranged to move relative to outer rim 33 in response to pressure applied by the heated pressure-generating roller 70 to extend radially inwardly under brim 20 to anchor frame 30 mechanically to brim 20 of container 14.

Canister 110 is a second embodiment in accordance with the present disclosure and comprises a container 14 and a closure 112 as suggested in FIGS. 11-14. Container 14 includes a body 16 formed to include an interior product-storage region 19 and a brim 20 coupled to an upper portion of body 16 to surround interior product-storage region 19. Closure 112 is arranged to mate with brim 20 to close an opening into interior product-storage region 19 to establish a hermetically sealed chamber 17 between container 14 and closure 112. Closure 112 includes a frame 130 coupled to brim 20 and a heat-activated sealant layer 301B included in frame 30 is bonded chemically to a radially outwardly facing outer side edge of brim 20, a topside 22 of brim 20, and an underside 22 of brim 20 to retain frame 130 in a stationary position on brim 20 of container 14.

Frame 130 of closure 112 further includes an outer closure layer 303B providing an exterior surface and a middle closure layer 302B interposed between and mated to sealant and outer closure layers 301B, 303B. Frame 130 includes an outer rim 133 comprising portions of sealant layer 301B, the outer closure layer 303B, and the middle closure layer 302B. Sealant layer 301B of outer rim 133 of frame 130 is bonded chemically to the radially outwardly facing exposed end portions 141E, 142E, 143E of each of inner, outer, and middle layers 141-143 of container 14 included in brim 20.

Frame 130 further includes a top wall 134 comprising portions of the sealant layer 301B, middle closure layer 302B, and outer closure layer 303B. Top wall 134 is coupled to outer rim 133, and the portion of sealant layer 301B included in top wall 134 is arranged to mate with and bond chemically to a portion of inner layer 141 of container 14 that is arranged to provide topside 22 of brim 20.

Frame 130 further includes an inner rim 135 surrounded by outer rim 133 and arranged to lie in spaced-apart relation to outer rim 133 and a top wall 134 arranged to interconnect inner and outer rims 135, 133. Top wall 134 of frame 130 is arranged to mate and bond chemically to topside 22 of brim 20. Inner rim 135 of frame 130 is arranged to lie in spaced-apart relation to outer rim 133 of frame 30 to locate brim 20 of container 14 therebetween.

Frame 130 includes an outer rim 133 having a radially inwardly facing side wall 133W facing toward the radially outwardly facing exposed end portions 141E, 142E, 143E of each of the inner, outer, and middle layers 141, 142, 143 of container 14. Outer rim 133 includes a portion of sealant layer 301B of outer rim 33 that is bonded chemically to the radially outwardly facing exposed end portions 141E, 142E, 143E of the inner, outer, and middle layers of container 14. Frame 130 further includes a retainer lip 133L coupled to a free end of outer rim 133 and arranged to extend radially inwardly under brim 20 and toward body 16 of container 14 and anchored mechanically and bonded chemically to an underside 24 of brim 20.

Frame 130 further includes an outer closure layer 303B arranged to form an exterior surface of frame 130 and a middle closure layer 302B interposed between the sealant and outer closure layers 301B, 303B of outer rim 133. Each of the outer and middle closure layers 303B, 302B of frame 130 is one of a solid-transmission barrier layer and a fluid-transmission barrier layer.

Outer closure layer 303B of inner rim 135 is configured to provide engagement means for engaging a back-up roller 80 to limit movement of closure 112 relative to container 14. Outer closure layer 303B of outer rim 133 is configured to provide means for receiving heat and pressure generated by a heated pressure-generating roller 70 while back-up roller 80 engages outer closure layer 303B of inner rim 135 to apply heat and pressure to outer rim 133 at a bond area established at a junction between sealant layer 301B of frame 130 of closure 112 and the radially outwardly facing exposed end portions 141E, 142E, 143E of the inner, outer, and middle layers 141-143 of container 14 to bond the sealant layer 301B of outer rim 133 of frame 130 of closure 112 to each of the radially outwardly facing exposed end portions 141E, 142E, 143E of the inner, outer, and middle layers 141-143 of container 14 and to move retainer lip 133L of frame 130 of closure 12 relative to outer rim 133 in a radially inward direction toward body 16 of container 14 to be anchored mechanically and bonded chemically to the underside of brim 20 of container 14.

A canister 210 in accordance with a third embodiment of the present disclosure is shown diagrammatically in FIG. 15 and illustratively in FIGS. 16-22. Canister 210 includes a closure 212 and a container 14 as suggested in FIG. 1. Closure 212 includes a cover-support frame 130 and a removable cover 232. Removable cover 232 includes a membrane seal 321, a pull tab 322 coupled to membrane seal 321, and a seal-support plate 323 arranged to underlie and mate with the underside of membrane seal 321. Seal-support plate 323 is coupled to the surrounding cover-support frame 230 by a frangible connector 230F. Frangible connector 230F is configured to break in any suitable manner when a consumer pulls outwardly on pull tab 322 to separate membrane seal 321 and seal-support plate 323 from cover-support frame 130.

Cover-support frame 130 in closure 212 is substantially the same as the cover-support frame 130 in closure 112. As suggested in FIG. 15, it is within the scope of this disclosure to bond portions of heat-activated seal layer 301B in frame 130 to topside 22, radially outwardly facing outer side edge 23, and underside 24 of brim 20.

The invention claimed is:
1. A canister comprising
   a container including a body formed to include an interior product-storage region and a brim coupled to an upper portion of the body to surround the interior product-storage region and
   a closure arranged to mate with the brim to close an opening into the interior product-storage region to establish a hermetically sealed chamber between the container and the closure, wherein the closure includes a frame coupled to the brim and a sealant layer included in the frame is for bonding chemically the frame to the brim to retain the frame in a stationary position on the brim until a user applies a force to the closure to break the chemical bond and cause the sealant layer to fracture and the entire closure to separate from the container to open the opening into the interior product-storage region until the user later mates the closure to the brim to reclose the opening without establishing a hermetically sealed chamber, and wherein the closure has a uniform thickness throughout.

2. The canister of claim 1, wherein the sealant layer included in the frame is bonded chemically to a topside of the brim that is arranged to face upwardly away from the body.

3. The canister of claim 2, wherein the sealant layer included in the frame is also bonded chemically to an underside of the brim that is arranged to lie in spaced-apart relation to the topside of the brim and a radially outwardly facing outer side edge of the brim is arranged to interconnect the topside and the underside of the brim.

4. The canister of claim 1, wherein the sealant layer included in the frame is also bonded chemically to an underside of the brim that is arranged to face downwardly toward ground underlying the container.

5. The canister of claim 1, wherein the container is a multi-layered structure comprising an inner layer defining a boundary of the interior product-storage region and a topside of the brim, an outer layer providing an exterior surface, and a middle layer interposed between and mated to the inner and outer layers, the brim is formed to expose each of these inner, outer, and middle layers of the container and to cause radially outwardly facing exposed end portions of the inner, outer, and middle layers of the container to cooperate to form a radially outwardly facing outer side edge of the brim, and the sealant layer included in the frame of the closure is bonded chemically to the radially outwardly facing exposed end portions of each of the inner, outer, and middle layers of the container included in the brim.

6. The canister of claim 5, wherein the frame of the closure further includes an outer closure layer providing an exterior surface and a middle closure layer interposed between and mated to the sealant and outer closure layers, the frame includes an outer rim comprising portions of the sealant layer, the outer closure layer, and the middle closure layer and the sealant layer of the outer rim of the frame is bonded chemically to the radially outwardly facing exposed end portions of each of the inner, outer, and middle layers of the container included in the brim.

7. The canister of claim 6, wherein the frame further includes a top wall comprising portions of the sealant layer, middle closure layer, and outer closure layer, the top wall is coupled to the outer rim, and the portion of the sealant layer included in the top wall is arranged to mate with a portion of the inner layer of the container that is arranged to provide the topside of the brim.

8. The canister of claim 7, wherein the portion of the sealant layer included in the top wall is bonded chemically to the topside of the brim.

9. The canister of claim 6, wherein the frame further includes an inner rim surrounded by the outer rim and arranged to lie in spaced-apart relation to the outer rim and a top wall arranged to interconnect the inner and outer rims, the top wall of the frame is arranged to mate with the topside of the brim, the inner rim of the frame is arranged to lie in spaced-apart relation to the outer rim of the frame to locate the brim of the container therebetween, the outer closure layer of the inner rim is configured to provide engagement means for engaging a back-up roller to limit movement of the closure relative to the container, and the outer closure layer of the outer rim is configured to provide means for receiving heat and pressure generated by a heated pressure-generating roller while the back-up roller engages the outer closure layer of the inner rim to apply heat and pressure to the outer rim at a bond area established at a junction between the sealant layer of the frame of the closure and the radially outwardly facing exposed end portions of the inner, outer, and middle layers of the container to bond the sealant layer of the frame of the closure to each of the radially outwardly facing exposed end portions of the inner, outer, and middle layers of the container.

10. The canister of claim 9, wherein the inner rim of the frame comprises portions of the sealant layer, the outer closure layer, and the middle closure layer, and the portion of the outer closure layer included in the inner rim is arranged to provide the engagement means.

11. The canister of claim 5, wherein the frame includes an outer rim having a radially inwardly facing side wall facing toward the radially outwardly facing exposed end portions of each of the inner, outer, and middle layers of the container and including a portion of the sealant layer of the outer rim that is bonded chemically to the radially outwardly facing exposed end portions of the inner, outer, and middle layers of the container and the frame further includes a retainer lip coupled to a free end of the outer rim and arranged to extend radially inwardly under the brim and toward the body of the container and anchored mechanically to an underside of the brim.

12. The canister of claim 11, wherein the brim includes a topside arranged to lie above and in spaced-apart relation to the underside, the radially outwardly facing side edge of the brim defined by the radially outwardly facing exposed end portions of each of the inner, outer, and middle layers of the container is arranged to interconnect the topside of the brim and the underside of the brim, the topside is defined by a portion of the inner layer of the container, the underside is defined by a portion of the outer layer of the container, and the frame of the closure further includes a top wall coupled to the outer rim and configured to include a portion of the sealant layer that is arranged to mate with the topside of the brim of the container.

13. The canister of claim 11, wherein the sealant layer of the frame is bonded chemically to one of the topside and the underside of the brim.

14. The canister of claim 13, wherein the sealant layer of the frame is bonded chemically to the other of the topside and the underside of the brim.

15. The canister of claim 11, wherein the frame further includes an outer closure layer arranged to form an exterior surface of the frame and a middle closure layer interposed between the sealant and outer closure layers of the outer rim and each of the outer and middle closure layers of the frame is one of a solid-transmission barrier layer and a fluid-transmission barrier layer.

16. The canister of claim 11, wherein the frame further includes an inner rim surrounded by the outer rim and arranged to lie in spaced-apart relation to the outer rim and a top wall arranged to interconnect the inner and outer rims, the top wall of the frame is arranged to mate with the topside of the brim, the inner rim of the frame is arranged to lie in spaced-apart relation to the outer rim of the frame to locate the brim of the container therebetween, the outer closure layer of the inner rim is configured to provide engagement means for engaging a back-up roller to limit movement of the closure relative to the container, and the outer closure layer of the outer rim is configured to provide means for receiving heat and pressure generated by a heated pressure-generating roller while the back-up roller engages the outer closure layer of the inner rim to apply heat and pressure to the outer rim at a bond area established at a junction between the sealant layer of the frame of the closure and the radially outwardly facing exposed end portions of the inner, outer, and middle layers of the container to bond the sealant layer of the outer rim of the frame of the closure to each of the radially outwardly facing exposed end portions of the inner, outer, and middle layers of the container and to move the retainer lip of the frame of the closure relative to the outer rim in a radially inward direction toward the body of the container to be anchored mechanically to the underside of the brim of the container.

17. The canister of claim 16, wherein the inner rim of the frame comprises portions of the sealant layer, the outer closure layer, and the middle closure layer, and the portion of the outer closure layer included in the inner rim is arranged to provide the engagement means.

18. The canister of claim 1, wherein the brim of the container includes an inner layer defining a topside, an outer layer defining an underside, and a middle layer lying between and mating with each of the inner and outer layers, each of the inner, outer, and middle layers includes a radially outwardly facing exposed end portion, and the sealant layer of the frame is bonded chemically to a radially outwardly facing exposed end portion of a first of the inner, outer, and middle layers.

19. The canister of claim 18, wherein the sealant layer is also bonded chemically to one of the topside and the underside of the brim.

20. The canister of claim 19, wherein the sealant layer is also bonded chemically to the other of the topside and the underside of the brim.

21. The canister of claim 18, wherein the sealant layer of the frame also is bonded chemically to a radially outwardly facing exposed end portion of a second of the inner, outer, and middle layers.

22. The canister of claim 21, wherein the sealant layer of the frame is bonded chemically to a radially outwardly facing exposed end portion of a third of the inner, outer, and middle layers.

23. The canister of claim 18, wherein the frame includes an outer rim having a radially inwardly facing side wall facing toward the radially outwardly facing exposed end portions of each of the inner, outer, and middle layers of the container and including a portion of the sealant layer of the outer rim that is bonded chemically to the radially outwardly facing exposed end portions of at least one of the inner, outer, and middle layers of the container and the frame further includes a retainer lip coupled to a free end of the outer rim and arranged to extend radially inwardly under the brim and toward the body of the container and anchored mechanically to an underside of the brim.

24. The canister of claim 1, wherein the frame of the closure is formed to include a product-discharge aperture opening into the interior product-storage region formed in the body when the closure is mounted on the container and the closure further includes a removable cover coupled to the frame to close the product-discharge aperture temporarily until a consumer later wishes to gain access to product stored in the interior product-storage region formed in the container body.

25. The canister of claim 24, wherein the frame includes an outer rim surrounding the brim, an inner rim surrounded by the brim, and a top wall interconnecting upper portions of the outer and inner rims, the outer rim includes the sealant layer, the inner rim is configured to provide engagement means for engaging a back-up roller to limit movement of the closure relative to the container, and the outer rim is configured to provide means for receiving heat and pressure generated by a heated pressure-generating roller while the back-up roller engages the inner rim to apply heat and pressure to the outer rim at a bond area established at a junction between the sealant layer of the outer rim of the frame of the closure and the radially outwardly facing outer side edge of the brim to bond the sealant layer of the outer rim to the radially outwardly facing outer side edge of the brim.

26. The canister of claim 25, wherein the frame further includes a retainer lip coupled to the outer rim and arranged to move relative to the outer rim in response to pressure applied by the heated pressure-generating roller to extend radially inwardly under the brim to anchor the frame mechanically to the brim of the container.

27. The canister of claim 25, wherein the frame further includes a cover foundation surrounded by and coupled to the inner rim and the cover foundation is formed to include the product-discharge aperture and to mate with an underside of the removable cover to close the product-discharge aperture.

28. The canister of claim 25, wherein the removable cover includes a membrane seal and a pull tab coupled to the membrane seal and the membrane seal includes a perimeter border coupled temporarily to a top wall of the cover foundation of the frame to close the product-discharge aperture.

29. The canister of claim 25, wherein the removable cover includes a membrane seal, a pull tab coupled to the membrane seal, and a seal-support plate arranged to underlie and mate with an underside of the membrane seal, the frame is arranged to surround the seal-support plate, and the seal-support plate is coupled to the surrounding frame by a frangible connector.

30. The canister of claim 1, wherein the frame includes an outer rim surrounding the brim, an inner rim surrounded by the brim, and a top wall interconnecting upper portions of the outer and inner rims, and the closure further includes a cover surrounded by and coupled permanently to the inner rim, the outer rim includes the sealant layer, the inner rim is configured to provide engagement means for engaging a back-up roller to limit movement of the closure relative to the container, and the outer rim is configured to provide means for receiving heat and pressure generated by a heated pressure-generating roller while the back-up roller engages the inner rim to apply heat and pressure to the outer rim at a bond area established at a junction between the sealant layer of the outer rim of the frame of the closure and the radially outwardly facing outer side edge of the brim to bond the sealant layer of the outer rim to the radially outwardly facing outer side edge of the brim.

31. The canister of claim 30, wherein the frame further includes a retainer lip coupled to the outer rim and arranged to move relative to the outer rim in response to pressure applied by the heated pressure-generating roller to extend radially inwardly under the brim to anchor the frame mechanically to the brim of the container.

32. The canister of claim 1, wherein the sealant layer comprises a multi-layer structure.

33. The canister of claim 32, wherein at least one layer of the multi-layer structure does not fracture when the user applies the force to the closure to break the chemical bond.

34. The canister of claim 1, wherein the frame mechanically bonds to the container after the closure is mated to the brim to reclose the opening.

35. A canister comprising
a container including a body formed to include an interior product-storage region and a brim coupled to an upper portion of the body to surround the interior product-storage region and a closure arranged to mate with the brim to close an opening into the interior product-storage region to establish a hermetically sealed chamber between the container and the closure, wherein the closure includes a frame coupled to the brim and a sealant layer for bonding chemically the frame to the brim to retain the frame in a stationary position on the brim until a user applies a force to the closure to break the chemical bond and cause the sealant layer to fracture and the entire closure to separate from the container to open the opening into the interior product-storage region until the user later mates the closure to the brim to reclose the opening without establishing a hermetically sealed chamber, and wherein the closure has a uniform thickness throughout.

36. The canister of claim 35, wherein the sealant layer comprises a multi-layer structure.

37. The canister of claim 36, wherein at least one layer of the multi-layer structure does not fracture when the user applies the force to the closure to break the chemical bond.

38. The canister of claim 35, wherein the frame mechanically bonds to the container after the closure is mated to the brim to reclose the opening.

\* \* \* \* \*